US011548736B2

(12) United States Patent
Greenwald

(10) Patent No.: US 11,548,736 B2
(45) Date of Patent: Jan. 10, 2023

(54) SYSTEM AND METHOD FOR ORGANIZING AND FEEDING CYLINDRICAL PRODUCTS FROM A BULK SUPPLY TO A PRODUCT TAKE AWAY CONVEYANCE

(71) Applicant: MGS MACHINE CORPORATION, Maple Grove, MN (US)

(72) Inventor: Randy Greenwald, Maple Grove, MN (US)

(73) Assignee: MGS MACHINE CORPORATION, Maple Grove, MN (US)

( * ) Notice: Subject to any disclaimer, the term of this patent is extended or adjusted under 35 U.S.C. 154(b) by 0 days.

(21) Appl. No.: 16/945,760

(22) Filed: Jul. 31, 2020

(65) Prior Publication Data

US 2021/0032048 A1 Feb. 4, 2021

Related U.S. Application Data

(60) Provisional application No. 62/881,932, filed on Aug. 1, 2019.

(51) Int. Cl.
*B65G 47/244* (2006.01)
*F41A 9/02* (2006.01)
*F41A 9/01* (2006.01)

(52) U.S. Cl.
CPC .............. *B65G 47/244* (2013.01); *F41A 9/01* (2013.01); *F41A 9/02* (2013.01); *B65G 2201/0217* (2013.01)

(58) Field of Classification Search
CPC .......... B65G 47/244; B65G 2201/0217; B65G 37/005; B65G 11/085; B65G 47/1471;

(Continued)

(56) References Cited

U.S. PATENT DOCUMENTS 2,403,862 A * 7/1946 Lakso ................ B65G 47/1457
198/389
3,635,325 A * 1/1972 Sterling ............. B65G 47/1428
198/397.05

(Continued)

OTHER PUBLICATIONS

International Search Report and Written Opinion rendered by the International Searching Authority for PCT/US20/44668, dated Nov. 18, 2020, 8 pages.

*Primary Examiner* — Mark A Deuble
(74) *Attorney, Agent, or Firm* — Skaar Ulbrich Macari, P.A.

(57) ABSTRACT

An automated machine for organizing and feeding cylindrical products includes a conveyor to space apart the cylindrical products. A pair of elongated rollers is disposed downstream from the conveyor to orient the cylindrical products in the same direction. A miter wheel disposed downstream of the pair of elongated rollers transfers the cylindrical products from the pair of rollers to a vertical accumulation chamber while changing the orientation of the cylindrical products from a vertical alignment to a horizontal alignment. The cylindrical products are discharged from the vertical accumulation chamber to a take away conveyance. Operation of the components of the automated machine can be controlled by a computer. Optical sensors can be employed to monitor flow of the cylindrical products through the automated machine during operation.

20 Claims, 15 Drawing Sheets

(58) Field of Classification Search
CPC .. B65G 2201/0226; F42B 33/002; F41A 9/01; F41A 9/03; F41A 9/02
See application file for complete search history.

(56) References Cited

U.S. PATENT DOCUMENTS

| | | | | |
|---|---|---|---|---|
| 3,942,645 | A * | 3/1976 | Aronson | B65B 43/44 |
| | | | | 209/545 |
| 4,122,933 | A * | 10/1978 | Starzyk | B65G 11/203 |
| | | | | 193/32 |
| 4,137,820 | A | 2/1979 | Clemens | |
| 4,223,778 | A * | 9/1980 | Kontz | B65G 47/1471 |
| | | | | 198/389 |
| 4,312,438 | A * | 1/1982 | Vatsvog | F42B 33/002 |
| | | | | 198/392 |
| 4,457,209 | A | 7/1984 | Scheurich et al. | |
| 4,549,662 | A * | 10/1985 | Schoenig, Jr. | G21C 17/06 |
| | | | | 209/539 |
| 4,717,026 | A * | 1/1988 | Fischer | B07C 5/02 |
| | | | | 194/205 |
| 4,881,447 | A | 11/1989 | Yanusko et al. | |
| 6,339,983 | B1 | 1/2002 | Mannhart | |
| 7,556,137 | B2 * | 7/2009 | Charpentier | B07C 5/02 |
| | | | | 198/369.7 |
| 8,522,956 | B2 * | 9/2013 | Tanner | B65G 47/256 |
| | | | | 198/395 |
| 10,040,645 | B2 * | 8/2018 | Brinster | B65G 47/24 |
| 2013/0125737 | A1 * | 5/2013 | Koskela | B65G 47/1457 |
| | | | | 86/45 |
| 2020/0278185 | A1 * | 9/2020 | Chicoine | B65B 35/14 |

* cited by examiner

SYSTEM AND METHOD FOR ORGANIZING AND FEEDING CYLINDRICAL PRODUCTS FROM A BULK SUPPLY TO A PRODUCT TAKE AWAY CONVEYANCE

PRIORITY

This application claims the priority benefit of U.S. Provisional Application No. 62/881,932, filed on Aug. 1, 2019, which is hereby incorporated herein by reference in its entirety.

FIELD

The present invention relates generally to automated product handling machinery, and more particularly, to automated machinery that organizes and feeds cylindrical products from a bulk supply to a product take away conveyance.

BACKGROUND

Automated machinery can be employed to handle cylindrical-shaped items such that the product is separated and flows in a consistent orientation into further stages of handling or packaging machinery.

Prior solutions employed vision inspection coupled with mechanical means or pneumatic means to remove individual products from a conveyor that were not in the desired orientation. However, this is inefficient because the output of product from the machine is reduced by approximately 50% due to the necessity of removing all improperly-aligned product from the conveyor line that must then be re-routed to an earlier stage of the machinery. Thus, output speeds of the automated machinery are limited.

A further drawback of conventional automated handling machinery for cylindrical-shaped items is that re-orientation of the product from one plane to another can produce jams and misalignments if the unit output speed of the product is set too fast. This is exacerbated by product that deviates from specified tolerances. Therefore, the operating speeds of the conventional machinery is quite limited and jams can occur more often than desired.

Therefore, there remains a need to improve the methods and apparatus for organizing and feeding cylindrical products from a bulk supply to a product take away conveyance.

SUMMARY

The disclosure addresses the problems discussed above by providing an automated machine for organizing and feeding cylindrical products. In one aspect, bulk products are loaded in into the hopper and proceed to a singulation device, proceed across a conveyor and into a pair of rollers to align product orientations before engaging pockets in a miter wheel assembly to transfer the products to a vertical accumulation chamber, where the products are discharged to a take away device. Additional aspects and details are described in the Detailed Description and illustrated in the various figures.

In another example aspect, an automated machine for organizing and feeding cylindrical products includes a conveyor to space apart the cylindrical products. A pair of elongated rollers is disposed downstream from the conveyor to orient the cylindrical products in the same direction. A miter wheel disposed downstream of the pair of elongated rollers transfers the cylindrical products from the pair of rollers to a vertical accumulation chamber while changing the orientation of the cylindrical products from a vertical alignment to a horizontal alignment. The cylindrical products are discharged from the vertical accumulation chamber to a take away conveyance. Operation of the components of the automated machine can be controlled by a computer. Optical sensors can be employed to monitor flow of the cylindrical products through the automated machine during operation.

The disclosure includes an automated machine for organizing and feeding cylindrical products. A pair of elongated rollers are disposed downstream from a conveyor. A miter wheel is disposed downstream of the pair of elongated rollers. A vertical accumulation chamber is provided to receive a plurality of the cylindrical products that exit the meter wheel. The cylindrical products can be bullet ammunition in one example.

Speed of the conveyor is variable to impart spacing between individual cylindrical products as the cylindrical products are introduced to the conveyor.

A constriction can be disposed between the conveyor and the pair of elongated rollers. The constriction can be sized and shaped such that cylindrical products falling within a predetermined dimensional range pass through the constriction and are accelerated ahead by an air jet provided to the constriction while cylindrical products that are larger than the predetermined dimensional range are stopped by the constriction.

A chute can be disposed downstream from the constriction that transitions the cylindrical products passing through the constriction to the pair of rollers.

The pair of rollers can be inclined vertically downward from the conveyor along a longitudinal axis of the pair of rollers. The pair of rollers can define a gap dimension laterally between the pair of rollers such that a small diameter end of the cylindrical products can pass through the gap but an opposing larger end of the cylindrical products cannot pass through the gap, thereby allowing each individual cylindrical product to freely swing as it travels along the rollers so that the small end is facing downward as the product proceeds forward longitudinally along the pair of rollers. Each roller in the pair of rollers can rotate in a direction opposite to one another to impart an upward force on the cylindrical products.

A plurality of optical sensors can be disposed throughout the automated machine to monitor flow of the cylindrical products through the automated machine, wherein the plurality of optical sensors are coupled to a computing device that automatically adjusts one or more operating parameters of the automated machine.

The miter wheel can defines a plurality of individual pockets in a perimeter surface of the miter wheel. The miter wheel also can be oriented transverse to both the pair of rollers and the vertical accumulation chamber. The miter wheel can comprise a section of a truncated cone with a cone angle such that the cylindrical products are transitioned by a half turn of the miter wheel from a vertical orientation as the cylindrical products exit the pair of rollers to a horizontal orientation as the cylindrical products are discharged into the vertical accumulation chamber.

The miter wheel can be coupled to a drive flange of a motor via a magnetic holding clamp. A magnetic attraction force between the drive flange and the magnetic holding clamp can be applied or removed by a control knob disposed atop the magnetic holding clamp. The magnetic attraction force between the magnetic holding clamp and the drive flange can be such that there is no slippage of the miter wheel in normal running conditions, but slippage will occur in the event of a jam condition encountered by the miter wheel.

The product path defined through the vertical accumulation chamber can be zig-zag and along a vertical axis. A plurality of level monitoring optical sensors can be provided to the vertical accumulation chamber to monitor a level of cylindrical product present in the vertical accumulation chamber. The plurality of level monitoring optical sensors can be coupled to a computing device that automatically adjusts one or more operating parameters of the automated machine.

A take away conveyance can be disposed adjacent to an outlet of the vertical accumulation chamber. The take away conveyance can define a plurality of scallops to cradle the cylindrical product in side-by-side arrangement as the cylindrical product exits the vertical accumulation chamber.

The disclosure also includes a method of operating an automated machine to organize and feed cylindrical products. A speed of a conveyor can be varied to impart spacing between individual cylindrical products as the cylindrical products are introduced to the conveyor. The cylindrical products can be passed longitudinally across a gap defined between a pair of rollers such that a small diameter end of the cylindrical products can pass through the gap but an opposing larger end of the cylindrical products cannot pass through the gap, thereby allowing each individual cylindrical product to freely swing as it travels along the gap. A miter wheel can be rotated to transfer cylindrical products from the pair of rollers to a vertical accumulation chamber while changing the orientation of the cylindrical products from a vertical alignment to a horizontal alignment.

A drive flange of a motor can be coupled to the miter wheel via a magnetic holding clamp. The magnetic attraction force between the magnetic holding clamp and the drive can be such that there is no slippage of the miter wheel in normal running conditions, but slippage will occur in the event of a jam condition encountered by the miter wheel. A rotating control knob can be disposed atop the magnetic holding clamp to decouple the drive flange from the miter wheel.

The cylindrical products can be passed through a restriction prior to the cylindrical products reaching the pair of rollers. The constriction can be sized and shaped such that the cylindrical products falling within a predetermined dimensional range pass through the constriction and are accelerated ahead by an air jet provided to the constriction while cylindrical products that are larger than the predetermined dimensional range are stopped by the constriction.

The cylindrical products can be passed from the vertical accumulation chamber to a take away conveyance disposed adjacent to an outlet of the vertical accumulation chamber. The take away conveyance can define a plurality of scallops to cradle the cylindrical product in side-by-side arrangement as the cylindrical product exits the vertical accumulation chamber.

The above summary is not intended to limit the scope of the invention, or describe each embodiment, aspect, implementation, feature or advantage of the invention. The detailed technology and preferred embodiments for the subject invention are described in the following paragraphs accompanying the appended drawings for people skilled in this field to well appreciate the features of the claimed invention. It is understood that the features mentioned hereinbefore and those to be commented on hereinafter may be used not only in the specified combinations, but also in other combinations or in isolation, without departing from the scope of the present invention.

Figure 1:
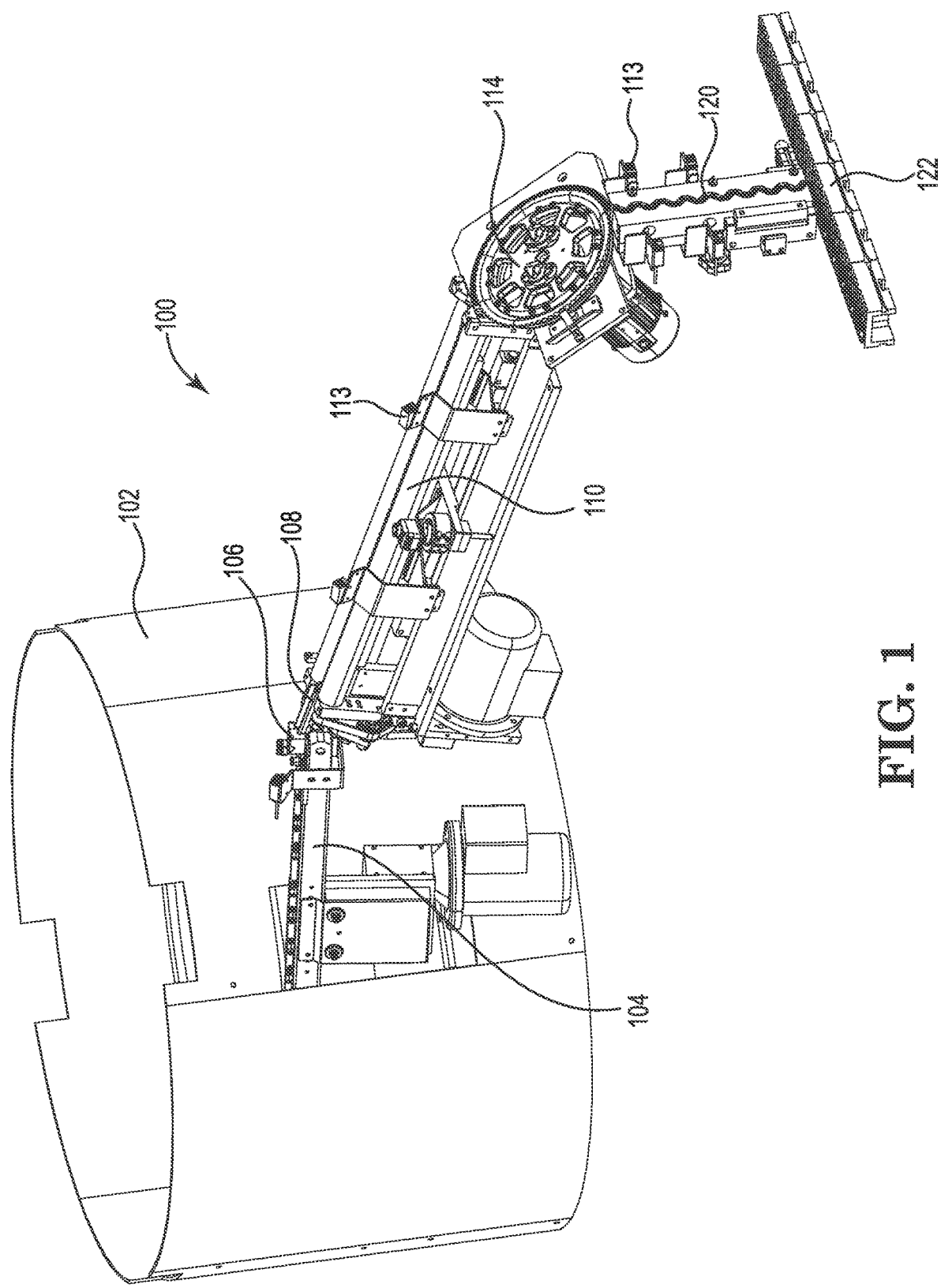
FIG. 1 is a perspective view of an automated machine for organizing and feeding cylindrical products according to certain embodiments.
Figure 2:
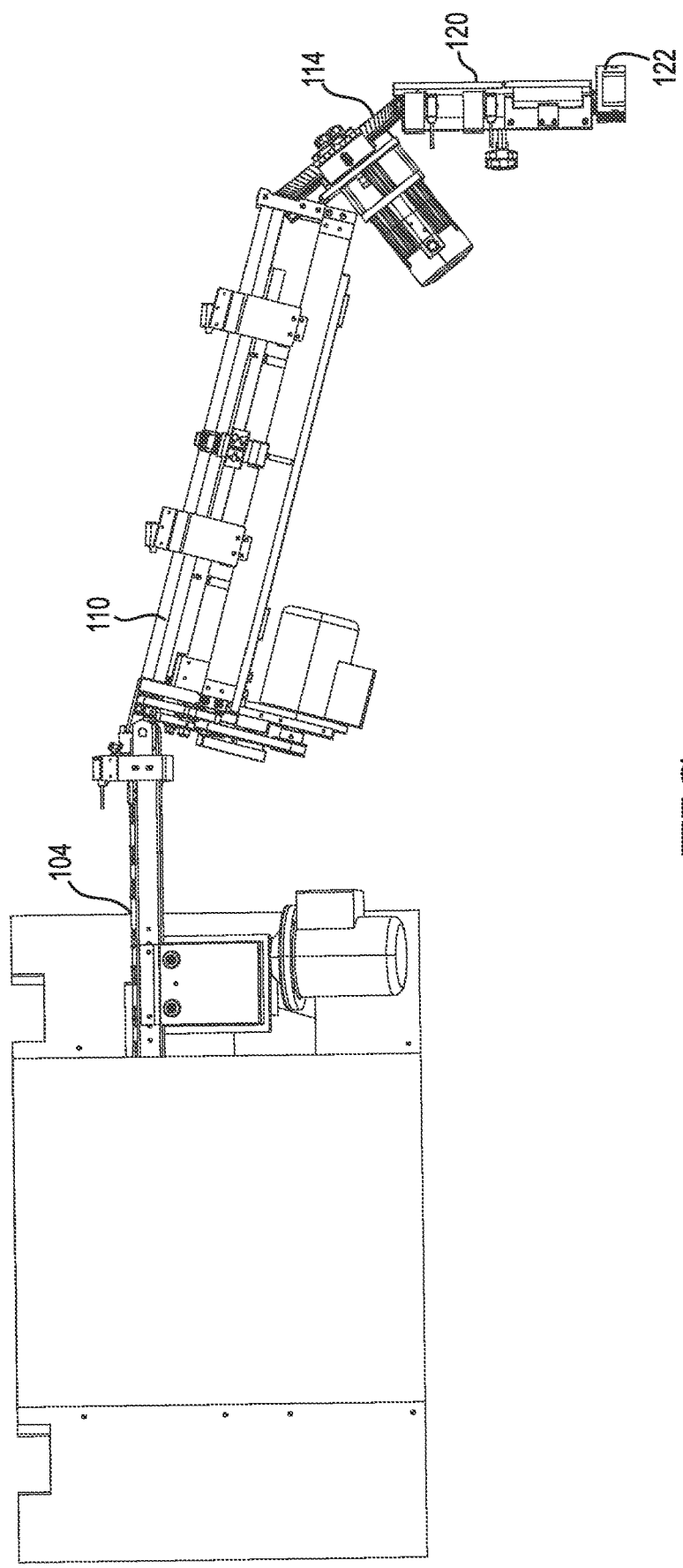
FIG. 2 is a top view of an automated machine for organizing and feeding cylindrical products according to certain embodiments.

While the invention is amenable to various modifications and alternative forms, specifics thereof have been shown by way of example in the drawings and will be described in detail. It should be understood, however, that the intention is not to limit the invention to the particular example embodiments described. On the contrary, the invention is to cover all modifications, equivalents, and alternatives falling within the scope of the invention as defined by the appended claims.

DETAILED DESCRIPTION

In the following descriptions, the present invention will be explained with reference to various exemplary embodiments. Nevertheless, these embodiments are not intended to limit the present invention to any specific example, environment, application, or particular implementation described herein. Therefore, descriptions of these example embodiments are only provided for purpose of illustration rather than to limit the present invention. It is understood that the various features and aspects discussed herein may be used in any combination, or in isolation, without departing from the scope of the present invention.

An automated machine 100 for organizing and feeding cylindrical products will now be described with reference to FIGS. 1-15. The machine description will correspond to the method or process by which the cylindrical objects pass through the machine as they proceed from bulk supply to the take away conveyance.

The cylindrical products (P) illustrated in the figures are bullet-type ammunition. However, other generally-cylindrical shaped products can also be handled by the disclosed machine because various shapes and sizes of components can be varied in order to adapt the machine to the alternate products.

The products P to be processed are first loaded in bulk into the hopper 102. The hopper is shown in many of the figures and particularly in FIG. 6.

The products are then metered into a singulation device connected to the hopper. The product outputs from the singulation device along a conveyor 104 (e.g., FIG. 5) such that the average output rate meets the operator's set output speed requirement. However, the instantaneous output rate varies above and below the set output rate.

Figure 5:
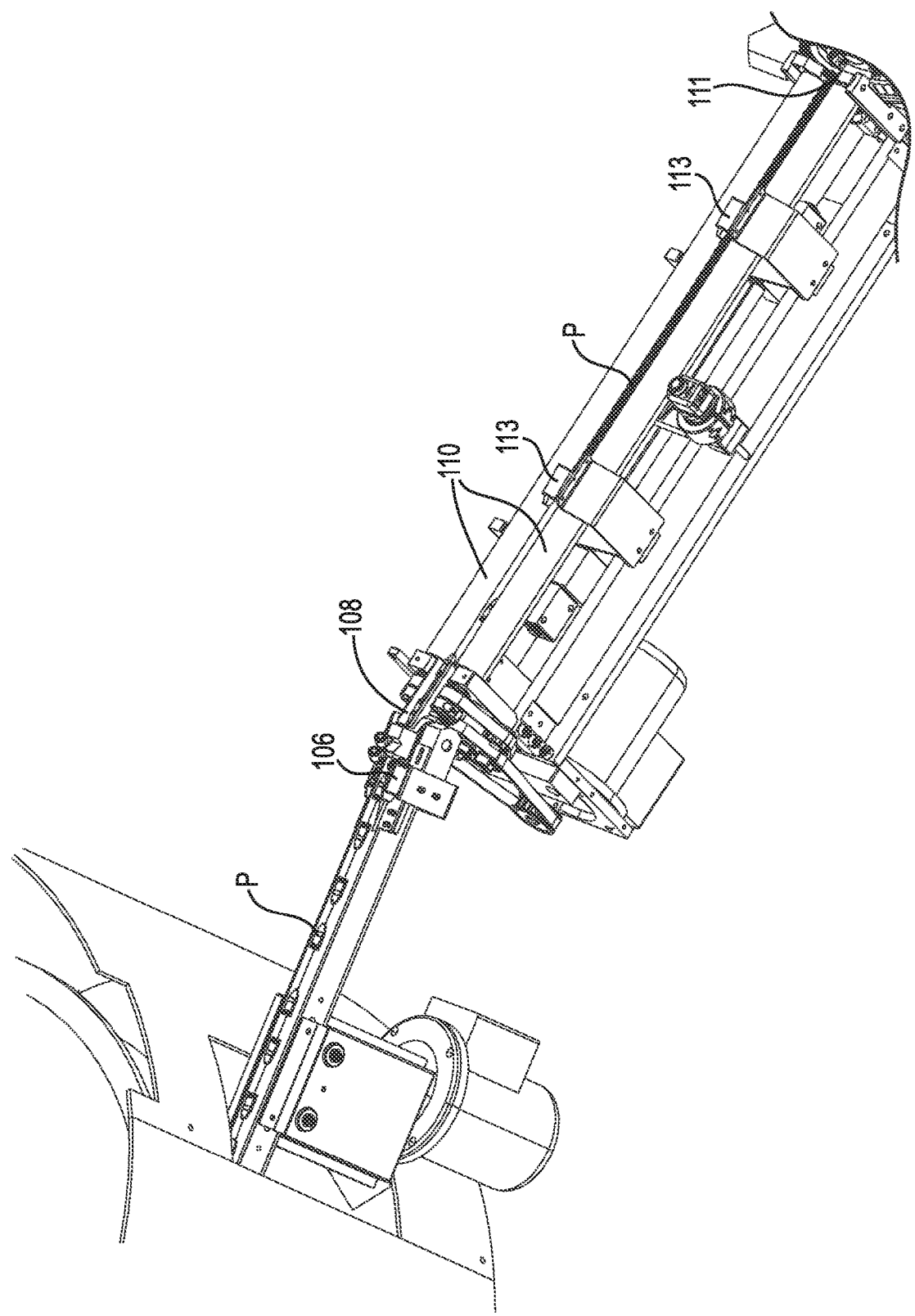
FIG. 5 is a partial perspective view of an automated machine for organizing and feeding cylindrical products according to certain embodiments.
Figure 6:
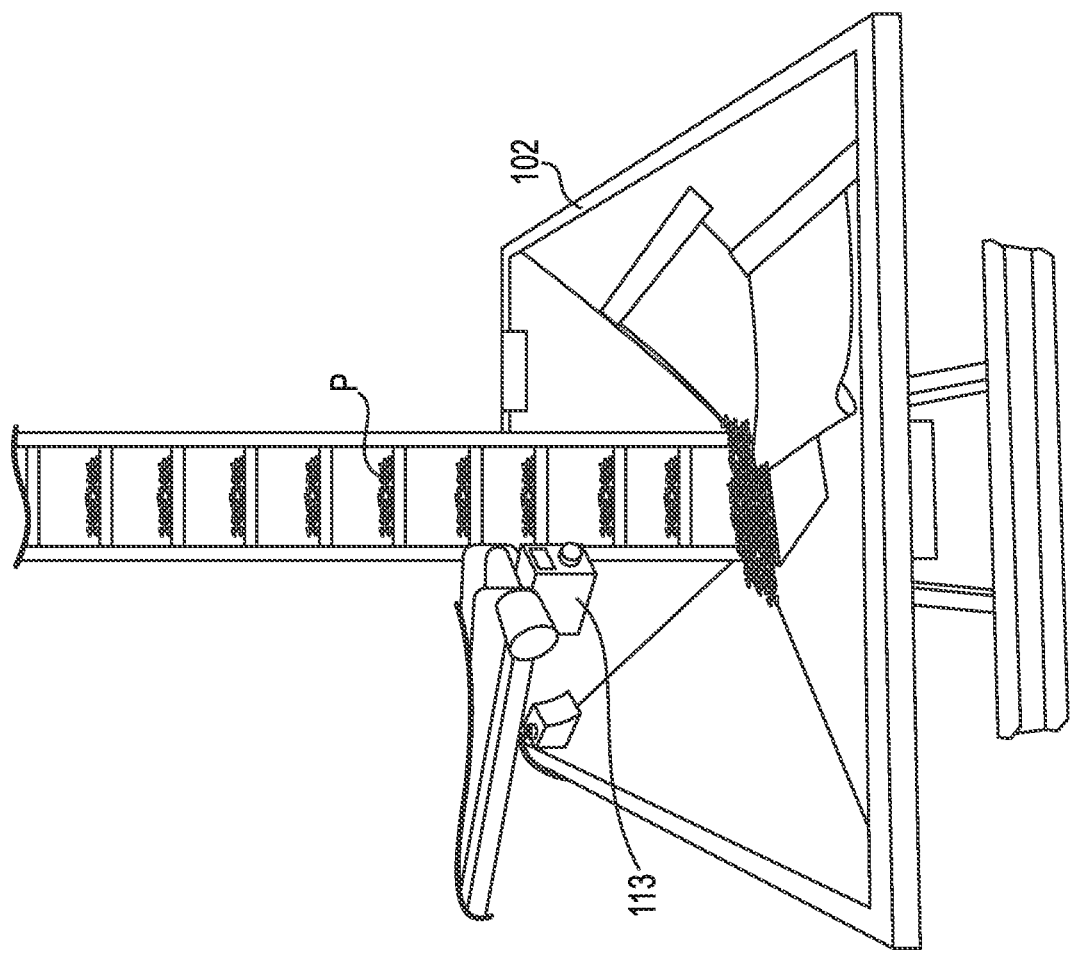
FIG. 6 is a perspective view of a hopper for an automated machine for organizing and feeding cylindrical products according to certain embodiments.
Figure 7:
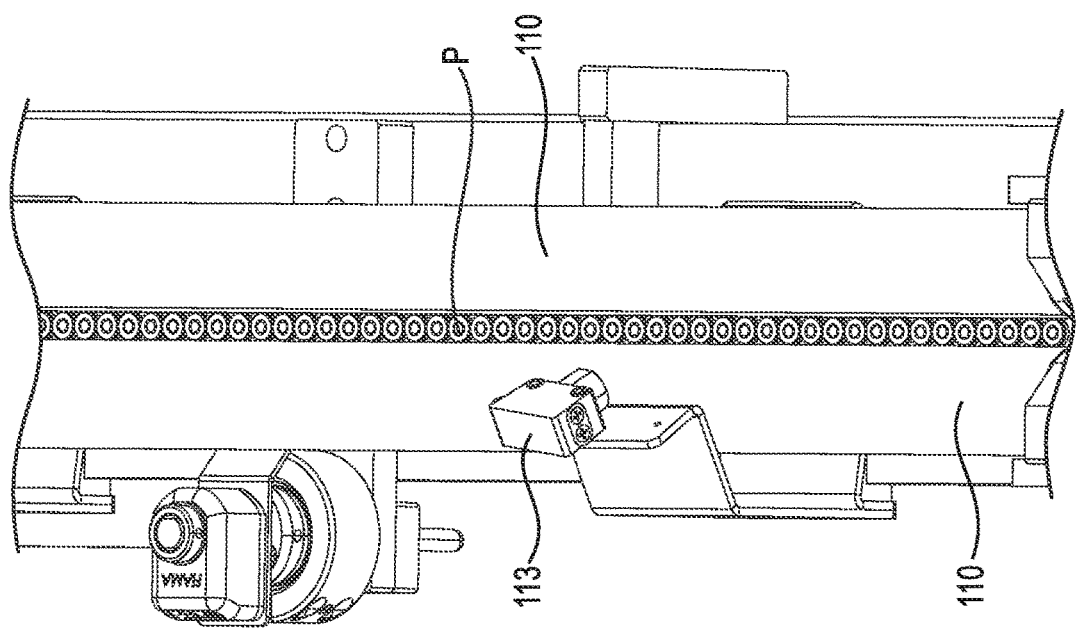
FIG. 7 is a perspective view of a roller section for an automated machine for organizing and feeding cylindrical products according to certain embodiments.
Figure 8:
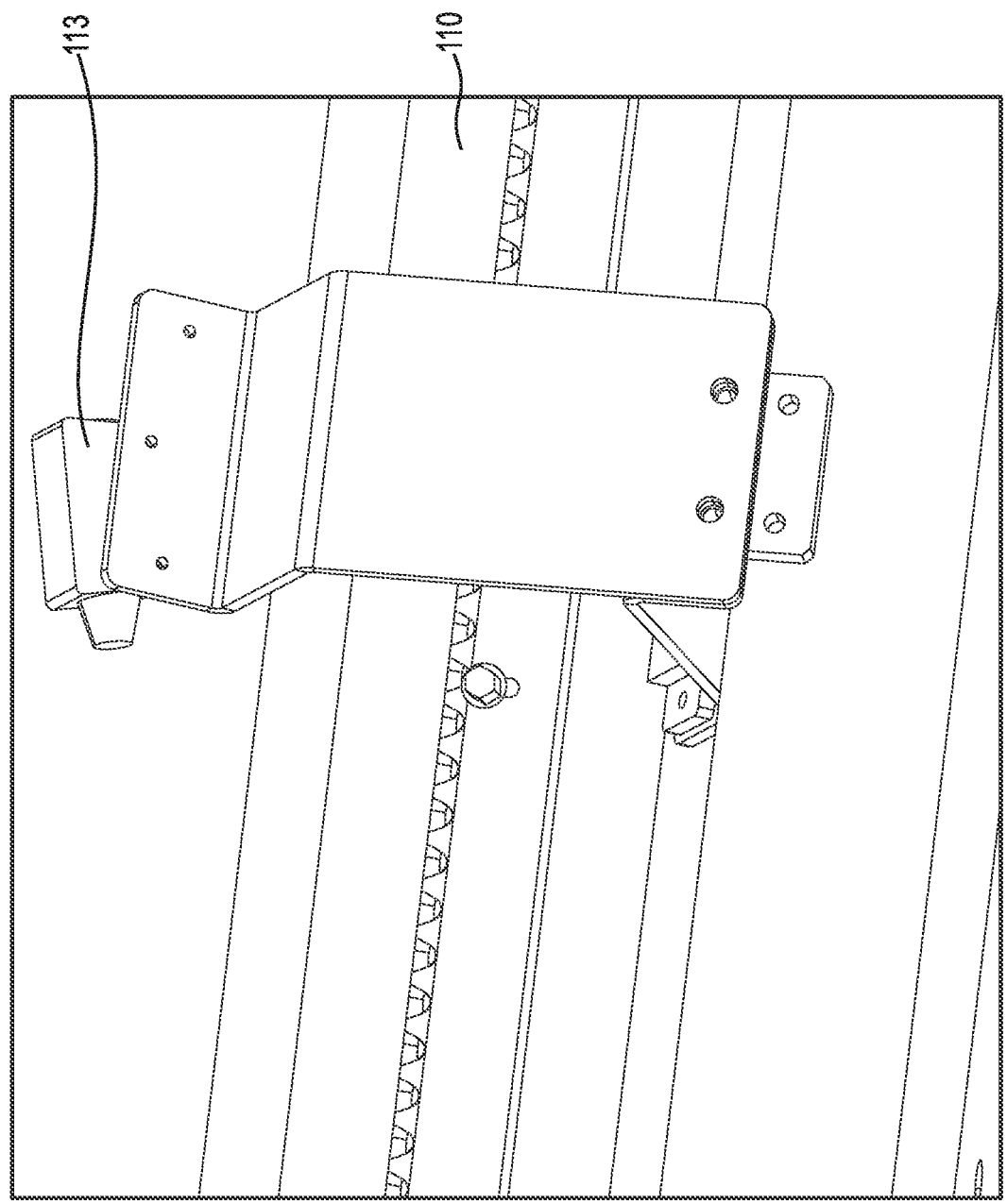
FIG. 8 is a side view of a roller section for an automated machine for organizing and feeding cylindrical products according to certain embodiments.
Figure 9:
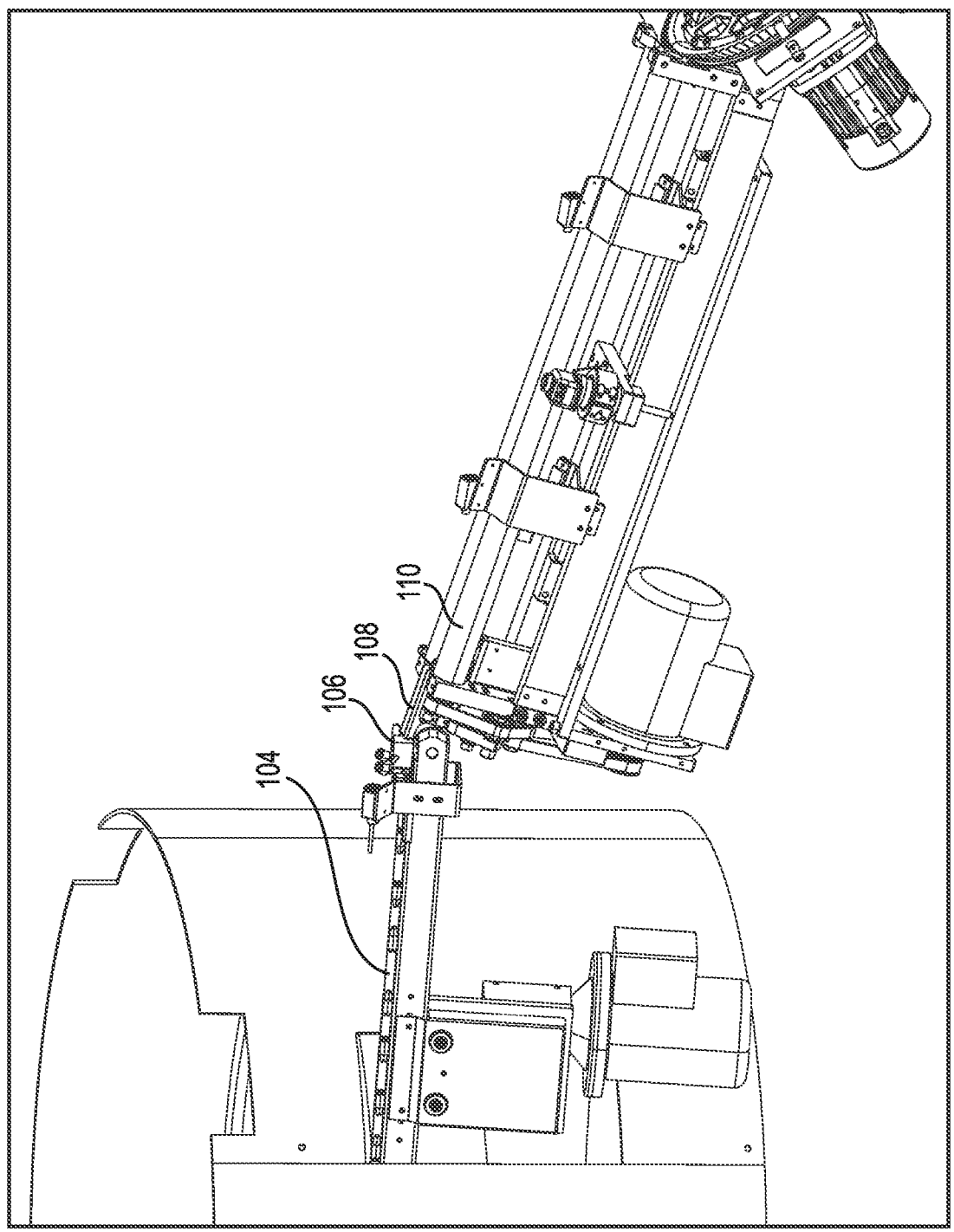
FIG. 9 is a partial perspective view of an automated machine for organizing and feeding cylindrical products according to certain embodiments.
Figure 10:
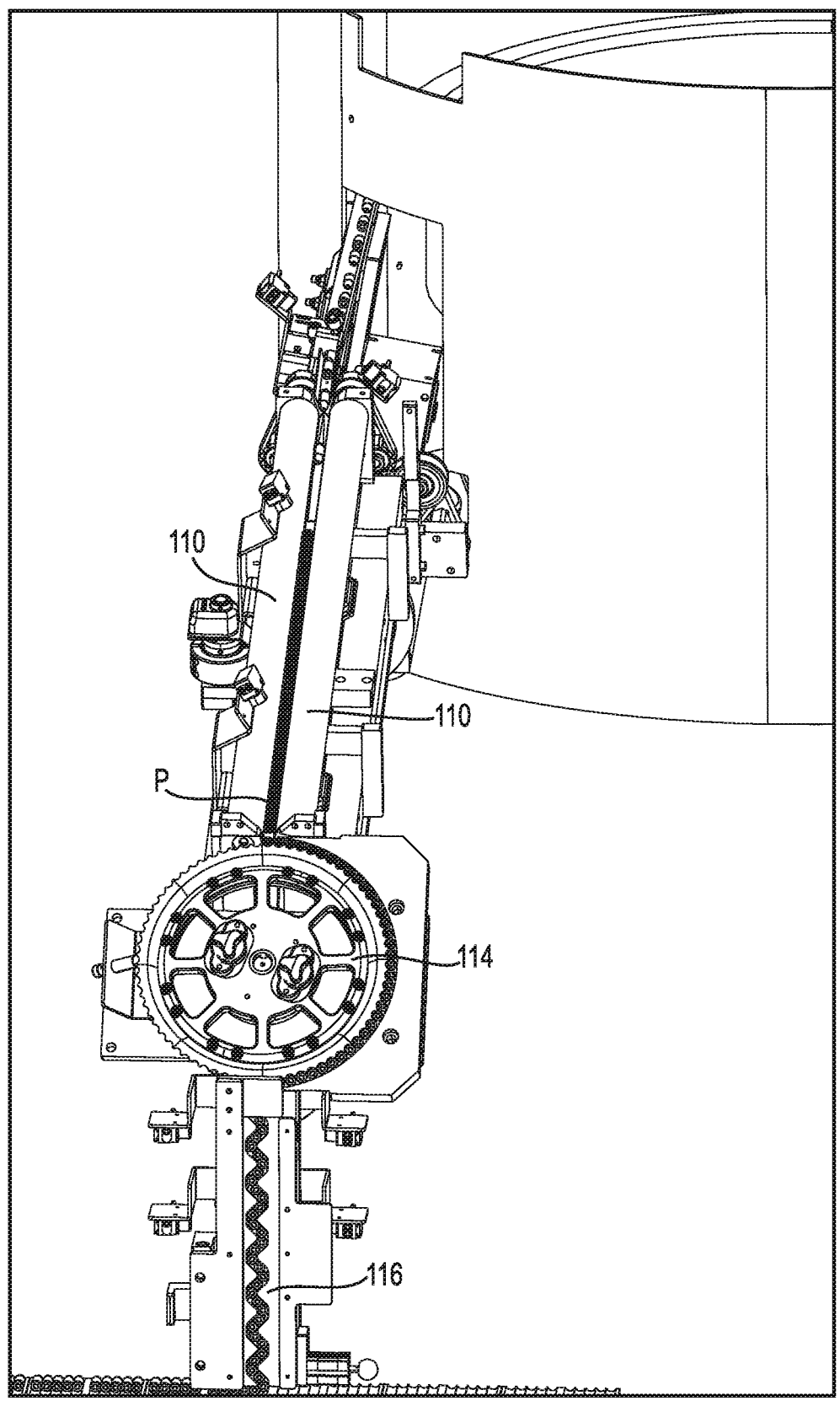
FIG. 10 is a partial perspective view of an automated machine for organizing and feeding cylindrical products according to certain embodiments.
Figure 11:
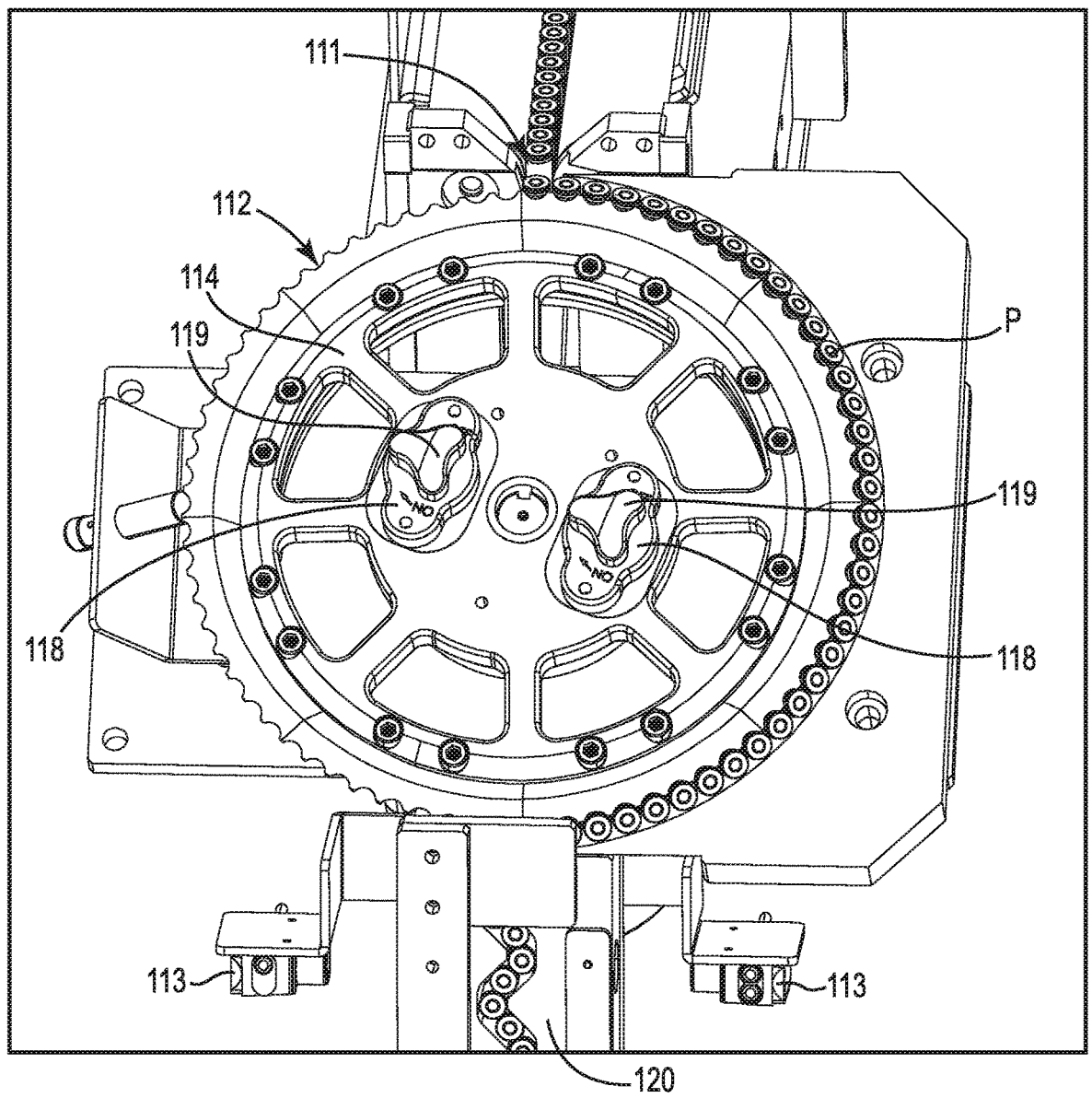
FIG. 11 is a partial perspective view of an automated machine for organizing and feeding cylindrical products according to certain embodiments.
Figure 12:
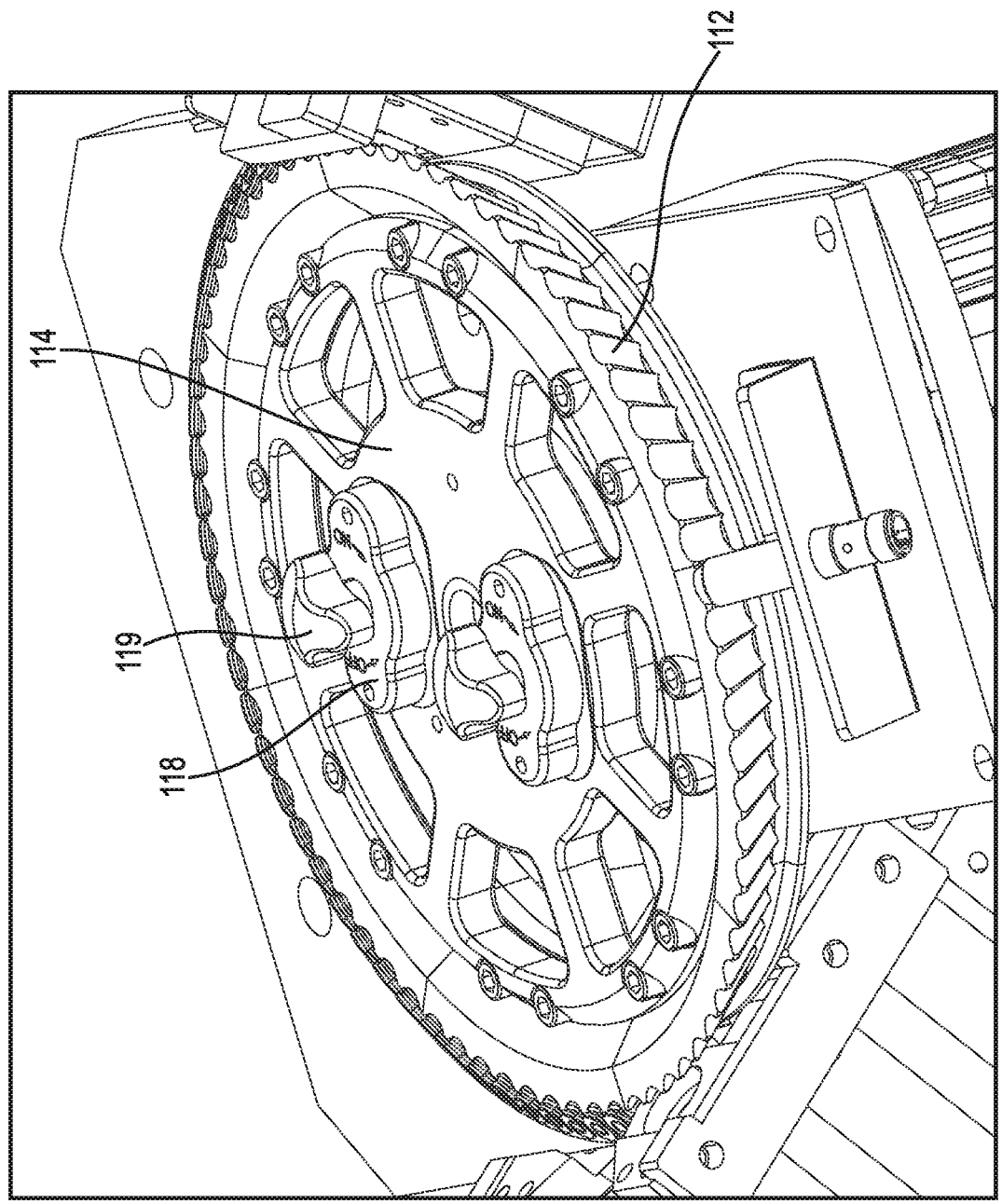
FIG. 12 is a partial perspective view of an automated machine for organizing and feeding cylindrical products according to certain embodiments.

The products P next side transfer from the singulation device onto the conveyor 104 which is operated with a conveyor surface speed slightly faster than that of the output of the singulation device. This relatively faster conveyor speed results in a gap being between each product. The products P being moved along the conveyor 104 are all arranged in a single file orientation as can be seen in FIG. 5, with some products oriented such that their large end is leading and some products oriented oppositely such that their small end is leading.

The products complete their journey along the conveyor 104 and enter a constriction 106 at the discharge of the transfer conveyor 104. Properly sized products pass thru this constriction and are accelerated ahead by air jets within the constriction. Products that are too large or that are misshapen to pass through the construction are stopped by the constriction and are automatically removed from the line by the machine.

The products P successfully passing through the restriction 106 next transfer to a chute 108 which includes air jets from the bottom of the chute which act as air bearings for the cute to provide free flow of product.

The products P then transfer from the chute 108 to gap defined between a pair of elongated rollers 110. These rollers spin in opposing directions at identical speeds. The rollers are mounted such that their longitudinal axis extends at a downward angle to define a sloped path such as can be appreciated from FIG. 4. The gap dimension between the rollers 110 is finely adjusted so that the small diameter end of the product P can pass between the rollers but the large diameter end cannot.

The aforementioned spacing between consecutive products proceeding through the roller section 110 is useful to allow each individual product to freely swing as it travels along the rollers so that the small end of the product is facing downward as the product proceeds forward in the gap between the rollers. The combination of the upward rotation of the rollers and the downward inclination (slope) of the rollers propels the product toward a discharge end 111 of the roller section 110.

The now consistently-oriented products traveling across the rollers surge against one another at the discharge end 111. The rollers are of a sufficient length to allow the upstream end of the product queue to move upstream and downstream in response to a varying discharge rate of the singulation device. This provides a buffer between the variable input rate and the constant discharge rate of the roller assembly 110.

Flow of product P into and out of the various stages of the machine 100 is monitored by a plurality of optical sensors 113. These sensors are coupled to computer controls that automatically adjust machine operating parameters, such as conveyor speed for example, to ensure maximized consistent flow of product through the machine 100.

The products P next transfer from the rollers 110 into individual pockets 112 formed in the perimeter of a miter wheel assembly 114. The miter wheel 114 rotates at a fixed speed to carry product from the roller assembly 110 to an accumulation device. The form of the wheel 114 is a truncated cone as can be seen best in FIGS. 4 and 12. The cone angle is such that the surface of the pockets is oriented parallel to the product axis at the transition from the roller assembly 110 and oriented horizontal at the discharge position 180° in rotation opposite the intake point. The product P is carried through the miter wheel 114 assembly at a constant rate.

The miter wheel 114 is coupled to the drive flange of a motor 116 via magnetic holding clamps 118. The magnetic attraction force between the drive flange and the magnetic holding clamps 118 is applied or removed by rotating the control knobs 119 atop the clamps 118. The magnetic attractive force between the friction surfaces on the miter wheel 114 and on the drive flange results in sufficient torque being transferred to rotate the miter wheel 114 in normal running conditions, but slippage will occur in the event of a jam condition. Thus the magnetic holding clamps 118 provide both a convenient miter wheel mounting means as well as overload/jam protection.

Figure 3:
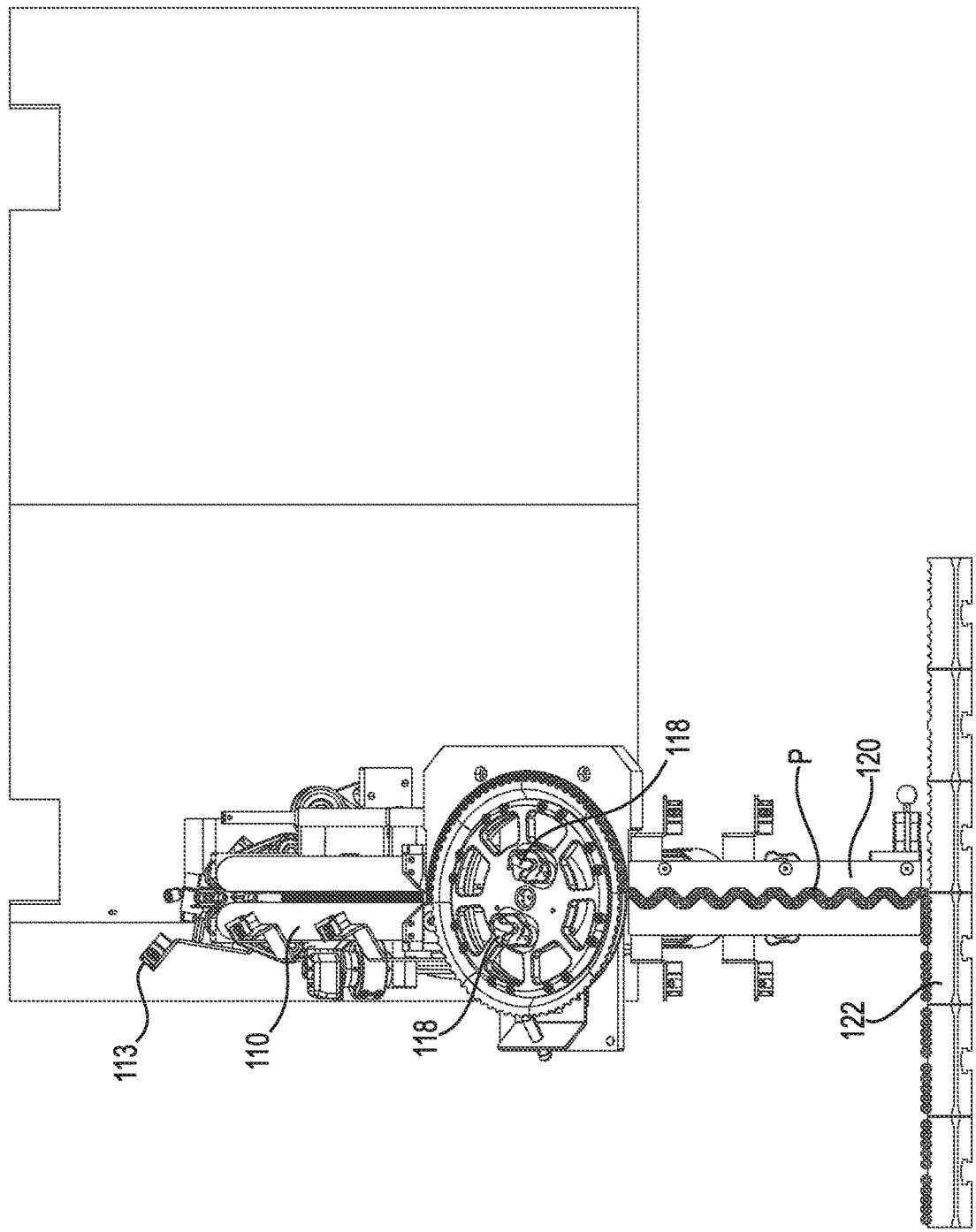
FIG. 3 is a front view of an automated machine for organizing and feeding cylindrical products according to certain embodiments.
Figure 4:
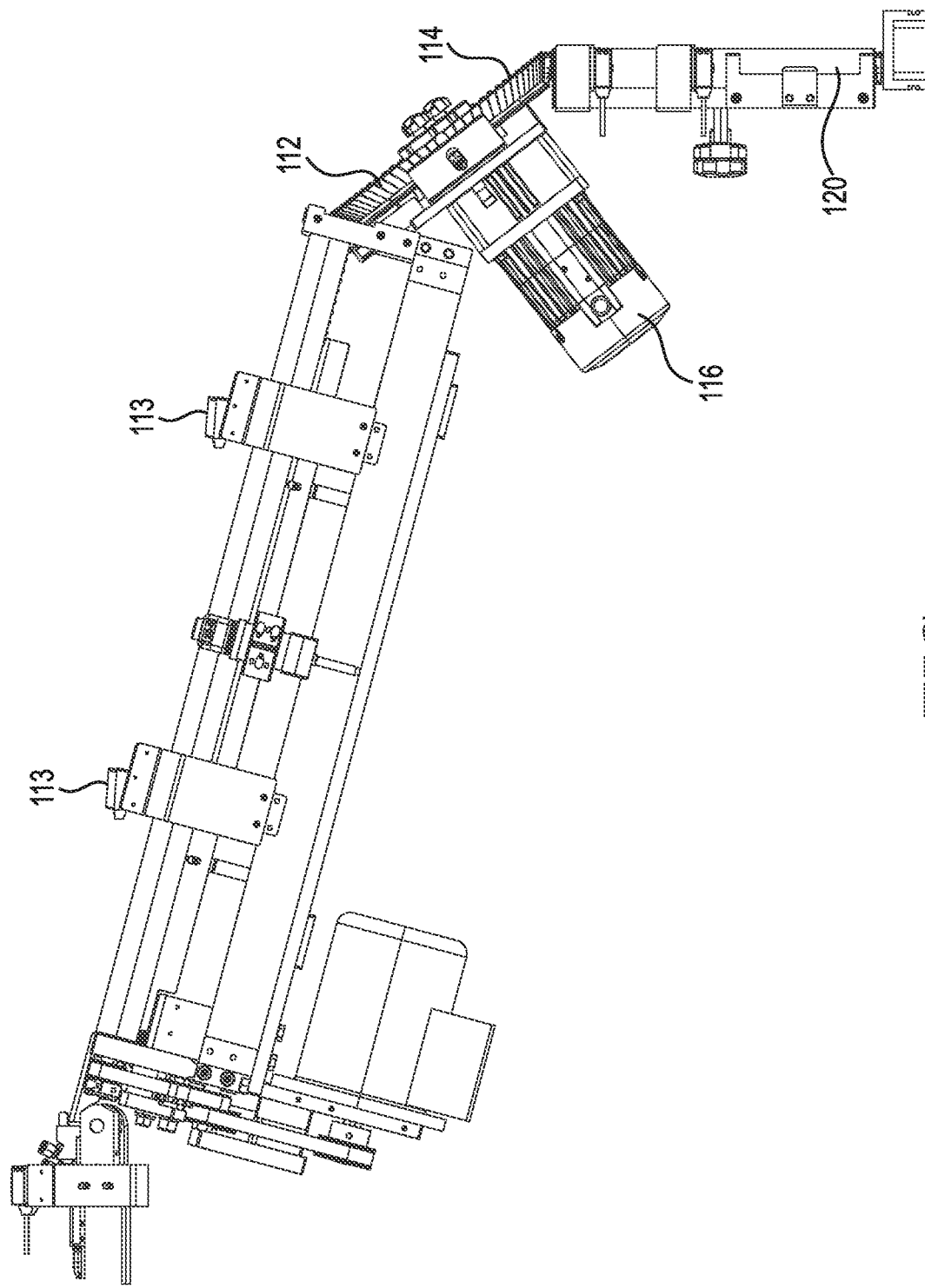
FIG. 4 is a side view of an automated machine for organizing and feeding cylindrical products according to certain embodiments.
Figure 13:
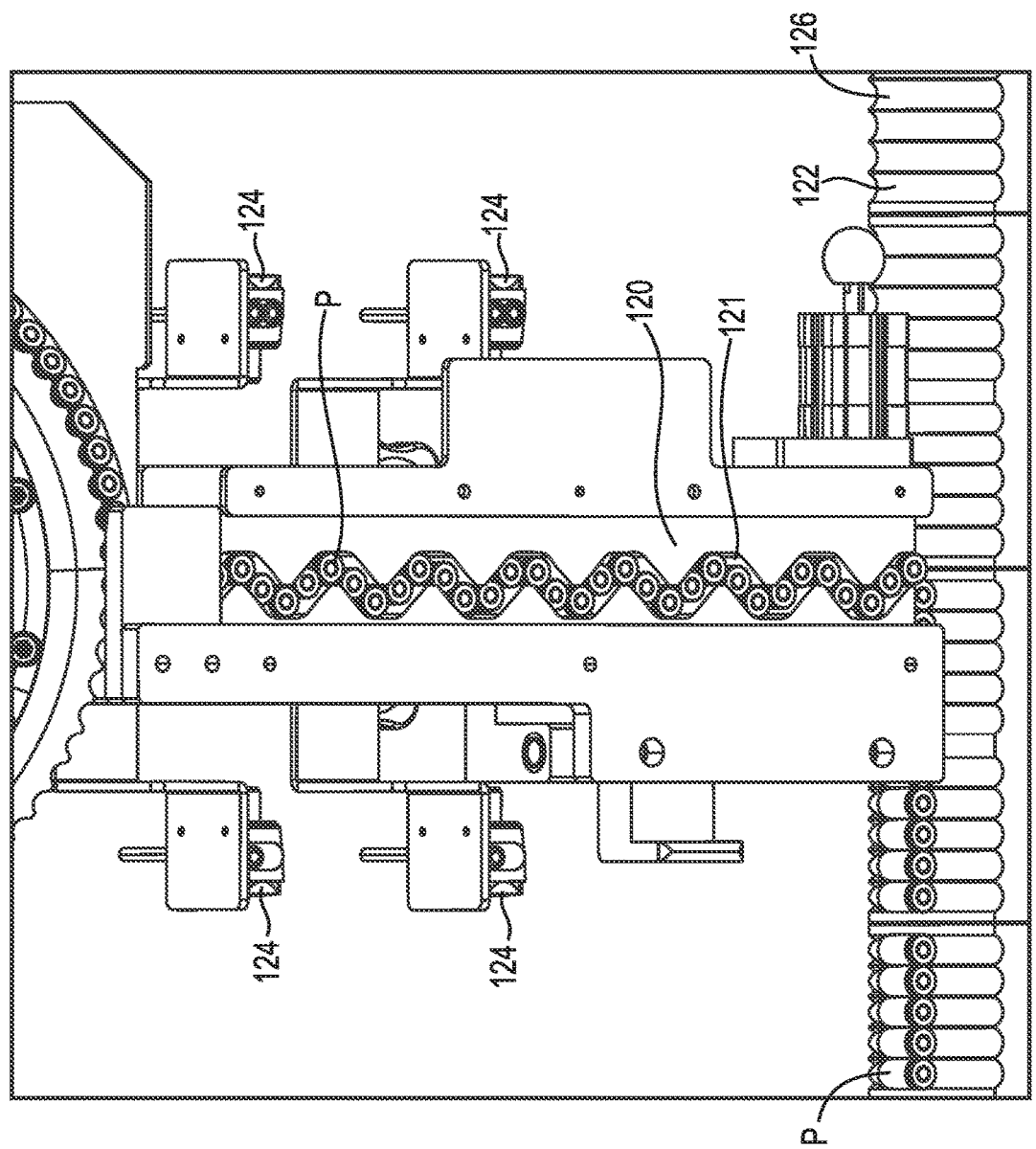
FIG. 13 is a partial front view of an automated machine for organizing and feeding cylindrical products according to certain embodiments.
Figure 14:
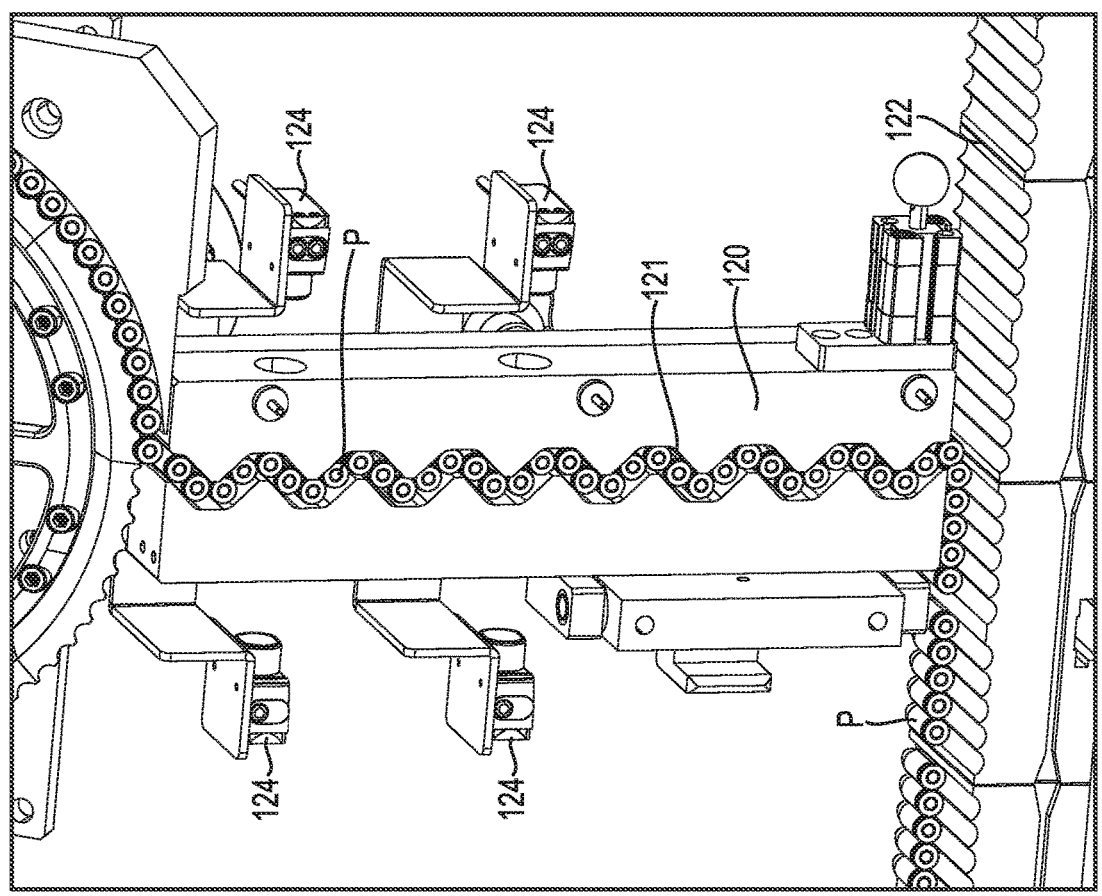
FIG. 14 is a partial perspective view of an automated machine for organizing and feeding cylindrical products according to certain embodiments.
Figure 15:
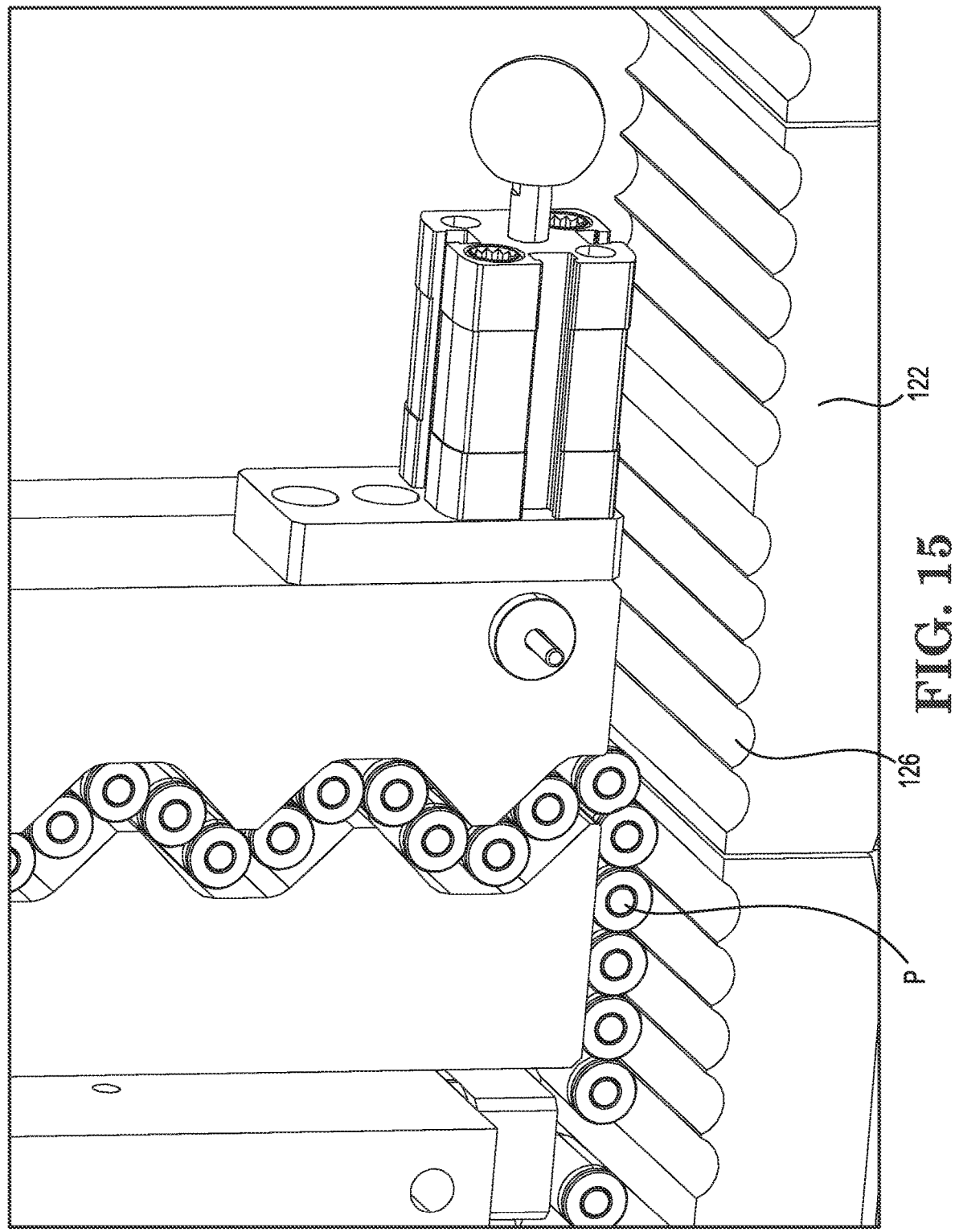
FIG. 15 is a partial perspective view of an automated machine for organizing and feeding cylindrical products according to certain embodiments.

The products P next transfer from the miter wheel assembly 114 to the input of a vertical accumulation chamber 120 (e.g., FIGS. 3 and 13). The product path 121 through the vertical accumulation chamber is zig-zag and along the vertical axis and laid out so that product's axis cannot rotate beyond approximately 45° from horizontal, thus providing smooth product flow and maintaining consistent product orientation. The product path through the vertical accumulation chamber 120 is of a length that allows the upstream end of the product queue to move upstream and downstream in response to varying rate of the take away device 122.

Flow of product into and out of the vertical accumulation chamber 120 is also controlled by level monitoring optical sensors 124 coupled to the machine's computer control system.

Product is transferred from the vertical accumulation chamber to a scalloped take away conveyance 122 (e.g., FIGS. 3 and 13-15) and which moves regularly in a move and dwell fashion under the output of the accumulation chamber 120. Product is removed from the accumulation chamber 120 when the take away conveyance 122 is in motion. The take away conveyance 122 can define a series of side-by-side channels 126 to prevent the product P from changing orientations and to keep a consistent spacing.

The device and method described herein advantageously control product movement in each of the elements of the device. The device is tolerant of product to product variation and does not dependent on tightly toleranced features. The machine features establish and maintain correct product orientation and minimize the likelihood of jams. The machine and method are thus able to be run at far higher product output speeds (e.g. 300-600 products per minute) than conventional systems.

While the invention has been described in connection with what is presently considered to be the most practical and preferred embodiments, it will be apparent to those of ordinary skill in the art that the invention is not to be limited to the disclosed embodiments. It will be readily apparent to those of ordinary skill in the art that many modifications and equivalent arrangements can be made thereof without departing from the spirit and scope of the present disclosure, such scope to be accorded the broadest interpretation of the appended claims so as to encompass all equivalent structures and products. Moreover, features or aspects of various example embodiments may be mixed and matched (even if such combination is not explicitly described herein) without departing from the scope of the invention.

What is claimed is:

1. An automated machine for organizing and feeding cylindrical products, comprising:
    a hopper;
    a motorized conveyor disposed downstream from the hopper;
    a pair of elongated rollers disposed downstream from the conveyor;
    a miter wheel disposed downstream of the pair of elongated rollers; and
    a vertical accumulation chamber to receive a plurality of the cylindrical products that exit the miter wheel.

2. The automated machine of claim 1, wherein a speed of the conveyor is variable to impart spacing between individual cylindrical products as the cylindrical products are introduced to the conveyor.

3. The automated machine of claim 1, further comprising a constriction disposed between the conveyor and the pair of elongated rollers, wherein the constriction is sized and shaped such that cylindrical products falling within a predetermined dimensional range pass through the constriction and are accelerated ahead by an air jet provided to the constriction while cylindrical products that are larger than the predetermined dimensional range are stopped by the constriction.

4. The automated machine of claim 3, further comprising a chute disposed downstream from the constriction that transitions the cylindrical products passing through the constriction to the pair of rollers.

5. The automated machine of claim 1, wherein the pair of rollers define a gap dimension laterally between the pair of rollers such that a small diameter end of the cylindrical products can pass through the gap but an opposing larger end of the cylindrical products cannot pass through the gap, thereby allowing each individual cylindrical product to freely swing as it travels along the rollers so that the small end is facing downward as the product proceeds forward longitudinally along the pair of rollers.

6. The automated machine of claim 1, wherein each roller in the pair of rollers rotates in a direction opposite to one another to impart an upward force on the cylindrical products.

7. The automated machine of claim 1, further comprising a plurality of optical sensors disposed throughout the automated machine to monitor flow of the cylindrical products through the automated machine, wherein the plurality of optical sensors are coupled to a computing device that automatically adjusts one or more operating parameters of the automated machine.

8. The automated machine of claim 1, wherein miter wheel defines a plurality of individual pockets in a perimeter surface of the miter wheel.

9. The automated machine of claim 8, wherein the miter wheel is oriented transverse to both the pair of rollers and the vertical accumulation chamber, and wherein the miter wheel comprises a section of a truncated cone with a cone angle such that the cylindrical products are transitioned by a half turn of the miter wheel from a vertical orientation as the cylindrical products exit the pair of rollers to a horizontal orientation as the cylindrical products are discharged into the vertical accumulation chamber.

10. The automated machine of claim 1, wherein the miter wheel is coupled to a drive flange of a motor via a magnetic holding clamp.

11. The automated machine of claim 10, wherein a magnetic attraction force between the drive flange and the magnetic holding clamp is applied or removed by a control knob disposed atop the magnetic holding clamp, and wherein the magnetic attraction force between the magnetic holding clamp and the drive flange is such that there is no slippage of the miter wheel in normal running conditions, but slippage will occur in the event of a jam condition encountered by the miter wheel.

12. The automated machine of claim 1, wherein a product path defined through the vertical accumulation chamber is zig-zag and along a vertical axis.

13. The automated machine of claim 1, further comprising a plurality of level monitoring optical sensors provided to the vertical accumulation chamber to monitor a level of cylindrical product present in the vertical accumulation chamber, wherein the plurality of level monitoring optical sensors are coupled to a computing device that automatically adjusts one or more operating parameters of the automated machine.

14. The automated machine of claim 1, further comprising a take away conveyance disposed adjacent to an outlet of the vertical accumulation chamber, the take away conveyance defining a plurality of scallops to cradle the cylindrical product in side-by-side arrangement as the cylindrical product exits the vertical accumulation chamber.

15. A method of operating an automated machine to organize and feed cylindrical products, the method comprising:
    conveying the cylindrical products from a hopper to a pair of rollers via a conveyor disposed downstream from the hopper;
    varying a speed of the conveyor to impart spacing between individual cylindrical products as the cylindrical products are introduced to the conveyor;
    passing the cylindrical products longitudinally across a gap defined between the pair of rollers such that a small diameter end of the cylindrical products can pass through the gap but an opposing larger end of the cylindrical products cannot pass through the gap, thereby allowing each individual cylindrical product to freely swing as it travels along the gap; and
    rotating a miter wheel to transfer cylindrical products from the pair of rollers to a vertical accumulation chamber while changing the orientation of the cylindrical products from a vertical alignment to a horizontal alignment.

16. The method of claim 15, further comprising:
    coupling to a drive flange of a motor to the miter wheel via a magnetic holding clamp, wherein the magnetic attraction force between the magnetic holding clamp and the drive is such that there is no slippage of the miter wheel in normal running conditions, but slippage will occur in the event of a jam condition encountered by the miter wheel; and rotating a control knob disposed atop the magnetic holding clamp to decouple the drive flange from the miter wheel.

17. The method of claim 15, further comprising passing the cylindrical products through a restriction prior to the cylindrical products reaching the pair of rollers, wherein the constriction is sized and shaped such that the cylindrical products falling within a predetermined dimensional range pass through the constriction and are accelerated ahead by an air jet provided to the constriction while cylindrical products that are larger than the predetermined dimensional range are stopped by the constriction.

18. The method of claim 15, further comprising passing the cylindrical products from the vertical accumulation chamber to a take away conveyance disposed adjacent to an outlet of the vertical accumulation chamber, wherein the take away conveyance defines a plurality of scallops to cradle the cylindrical product in side-by-side arrangement as the cylindrical product exits the vertical accumulation chamber.

19. An automated machine for organizing and feeding cylindrical products, comprising:
    a pair of elongated rollers;
    a miter wheel disposed downstream of the pair of elongated rollers; and
    a vertical accumulation chamber to receive a plurality of the cylindrical products that exit the miter wheel,
    wherein the miter wheel is coupled to a drive flange of a motor via a magnetic holding clamp.

20. The automated machine of claim 19, wherein a magnetic attraction force between the drive flange and the magnetic holding clamp is applied or removed by a control knob disposed atop the magnetic holding clamp, and wherein the magnetic attraction force between the magnetic holding clamp and the drive flange is such that there is no slippage of the miter wheel in normal running conditions, but slippage will occur in the event of a jam condition encountered by the miter wheel.

* * * * *